US012000128B2

(12) United States Patent
Yamazaki

(10) Patent No.: US 12,000,128 B2
(45) Date of Patent: Jun. 4, 2024

(54) DISPOSER

(71) Applicants: YASUNAGA AIR PUMP INC., Nabari (JP); YASUNAGA CORPORATION, Iga (JP)

(72) Inventor: Seiichi Yamazaki, Nabari (JP)

(73) Assignees: YASUNAGA AIR PUMP INC., Nabari (JP); YASUNAGA CORPORATION, Iga (JP)

( * ) Notice: Subject to any disclaimer, the term of this patent is extended or adjusted under 35 U.S.C. 154(b) by 447 days.

(21) Appl. No.: 17/309,840

(22) PCT Filed: Feb. 4, 2020

(86) PCT No.: PCT/JP2020/004142
§ 371 (c)(1),
(2) Date: Jun. 23, 2021

(87) PCT Pub. No.: WO2020/166434
PCT Pub. Date: Aug. 20, 2020

(65) Prior Publication Data
US 2022/0074179 A1 Mar. 10, 2022

(30) Foreign Application Priority Data
Feb. 14, 2019 (JP) ................................ 2019-024674

(51) Int. Cl.
*B02C 23/36* (2006.01)
*E03C 1/266* (2006.01)

(52) U.S. Cl.
CPC ............ *E03C 1/2665* (2013.01); *B02C 23/36* (2013.01)

(58) Field of Classification Search
CPC ........ E03C 1/2665; E03C 1/266; B02C 23/36
(Continued)

(56) References Cited

U.S. PATENT DOCUMENTS 2,565,322 A * 8/1951 Powers ................. E03C 1/2665 241/46.08
2,566,069 A * 8/1951 Powers ................. E03C 1/2665 241/46.08
(Continued)

FOREIGN PATENT DOCUMENTS

JP 2005-254220 A 9/2005
JP 2006-055786 A 3/2006
(Continued)

OTHER PUBLICATIONS

International Search Report and Written Opinion for corresponding International Application No. PCT/JP2020/004142 dated Apr. 7, 2020.

*Primary Examiner* — Faye Francis
(74) *Attorney, Agent, or Firm* — Westman, Champlin & Koehler, P.A.

(57) ABSTRACT

A disposer includes: a housing with an inlet portion in an upper part thereof through which kitchen waste is thrown in, and an outlet portion on a lower lateral face thereof through which the kitchen waste is discharged together with water; a rotating plate provided in a rotatable manner to separate an inner space of the housing into a pulverization chamber positioned on a side of the inlet portion, and a discharging chamber positioned on a side of the outlet portion; a hammer on the rotating plate; and an annular fixed blade that is provided on an inner lateral face of the housing to surround the rotating plate with an interval, and pulverizes the kitchen waste in cooperation with the hammer, in which a visor portion that regulates communication in a vertical direction toward a gap between the rotating plate and the fixed blade is formed above the outlet portion.

2 Claims, 5 Drawing Sheets

(58) Field of Classification Search
USPC .................................................... 241/46.013
See application file for complete search history.

(56) References Cited

U.S. PATENT DOCUMENTS

| | | | | | |
|---|---|---|---|---|---|
| 2,678,775 | A * | 5/1954 | Simmons | E03C 1/2665 | 241/46.016 |
| 2,682,376 | A * | 6/1954 | Frank | E03C 1/2665 | 241/46.11 |
| 2,730,308 | A * | 1/1956 | Jordan | E03C 1/2665 | 241/46.016 |
| 2,742,236 | A * | 4/1956 | Sutton | E03C 1/2665 | 241/46.11 |
| 2,743,875 | A * | 5/1956 | Ferguson | E03C 1/2665 | 241/286 |
| 2,760,730 | A * | 8/1956 | Jordan | E03C 1/2665 | 241/46.013 |
| 2,762,004 | A * | 9/1956 | Shepardson | H02H 7/0858 | 241/46.013 |
| 2,801,803 | A * | 8/1957 | Borman | E03C 1/2665 | 241/46.013 |
| 2,824,702 | A * | 2/1958 | Lee | E03C 1/2665 | 241/46.016 |
| 2,853,248 | A * | 9/1958 | Long | E03C 1/2665 | 241/46.016 |
| 2,909,333 | A * | 10/1959 | Shewmon | E03C 1/2665 | 241/257.1 |
| 3,071,329 | A * | 1/1963 | Shell | E03C 1/2665 | 241/258 |
| 4,422,580 | A * | 12/1983 | Shepherd | B02C 18/0092 | 241/46.11 |
| 4,573,642 | A * | 3/1986 | Spelber | E03C 1/2665 | 241/46.06 |
| 6,439,487 | B1 * | 8/2002 | Anderson | E03C 1/2665 | 241/46.08 |
| 7,607,599 | B2 * | 10/2009 | Jara-Almonte | E03C 1/2665 | 241/46.016 |
| 9,506,231 | B2 * | 11/2016 | Gormley | B02C 18/0084 | |
| 2016/0002900 | A1 * | 1/2016 | Gormley | B02C 23/36 | 241/83 |
| 2023/0001421 | A1 * | 1/2023 | Obermeyer | B02C 18/0092 | |

FOREIGN PATENT DOCUMENTS

| | | | |
|---|---|---|---|
| JP | 2007-105670 | A | 4/2007 |
| JP | 2009-039631 | A | 2/2009 |

* cited by examiner

DISPOSER

CROSS-REFERENCE TO RELATED APPLICATION(S)

This Application is a Section 371 National Stage Application of International Application No. PCT/JP2020/004142, filed Feb. 4, 2020 and published as WO 2020/166434 A1 on Aug. 20, 2020, and further claims priority to Japanese Application Ser. No. 2019-024674, filed Feb. 14, 2019.

TECHNICAL FIELD

The present invention relates to a disposer that carries out a pulverization process of kitchen waste and discharges the kitchen waste.

BACKGROUND ART

Kitchen waste generated from vegetables, fishes and the like in a kitchen causes a bad odor and results in poor hygiene. A disposer for conveniently disposing of the kitchen waste has therefore been brought into practical applications. Such a disposer is installed below a sink with an inlet opening thereof being connected to a drainage outlet of the sink, and is configured such that: kitchen waste generated in association with cooking is thrown into the disposer through the drainage outlet of the sink; and then, once the drainage outlet is closed with a lid, a pulverization mechanism provided inside the disposer is activated to carry out a pulverization process of the kitchen waste.

The aforementioned disposer is configured to, for example, rotationally drive a movable blade and a hammer by means of a motor to pulverize the kitchen waste with a fixed blade provided in an annular array on an inner wall, and to discharge, together with tap water, the kitchen waste thus pulverized from an outlet portion to sewerage, through piping and a trap. However, when insufficiently pulverized fibrous kitchen waste passes through the pulverization mechanism, the kitchen waste is likely to be tangled due to stagnancy of water in the vicinity of the outlet portion, causing clogging of the outlet portion or a downstream part thereof. Given this, the prior art disclosed in Patent Document 1 provides a kitchen waste removal part on a rotating plate which rotates the hammer, to scrape away the kitchen waste remaining in the vicinity of the outlet portion.

PRIOR ART DOCUMENT

Patent Document

Patent Document 1: Japanese Patent Laid-Open No. 2006-55786

SUMMARY OF THE INVENTION

Problems to be Solved by the Invention

However, the prior art described above is configured to scrape away an agglomerate of the kitchen waste formed in a discharging chamber in a downstream side of the rotating plate, and the agglomerate may again clog the outlet portion or the downstream part thereof, unless there is a means for decomposing the agglomerate in the discharging chamber. In addition, providing a separate mechanism for decomposing the agglomerate of the kitchen waste formed through entanglement of fibers in the discharging chamber may lead to an increase in the cost of the disposer.

The present invention has been made in view of the aforementioned problems, and disclosed embodiments of the present invention provide a disposer that enables suppression of clogging of the outlet portion while preventing an increase in the cost.

Means for Solving the Problems

An aspect of the present invention is directed to the disposer according to the present invention that includes: a housing provided with an inlet portion in an upper part thereof through which kitchen waste is thrown in, and an outlet portion on a lower lateral face thereof through which the kitchen waste is discharged together with water; a rotating plate provided in a rotatable manner to separate an inner space of the housing into a pulverization chamber positioned on a side of the inlet portion, and a discharging chamber positioned on a side of the outlet portion; a hammer provided on the rotating plate; and an annular fixed blade that is provided on an inner lateral face of the housing to surround the rotating plate with an interval, and pulverizes the kitchen waste in cooperation with the hammer, in which a communication regulation portion that regulates communication in a vertical direction toward a gap between the rotating plate and the fixed blade is formed above the outlet portion.

Advantageous Effects of the Invention

According to the present invention, a disposer can be provided that enables suppression of clogging of the outlet portion while preventing an increase in the cost.

The present summary is provided only by way of example, and not limitation. Other aspects of the present invention will be appreciated in view of the entirety of the present disclosure, including the entire text, claims and accompanying figures.

Figure 1:
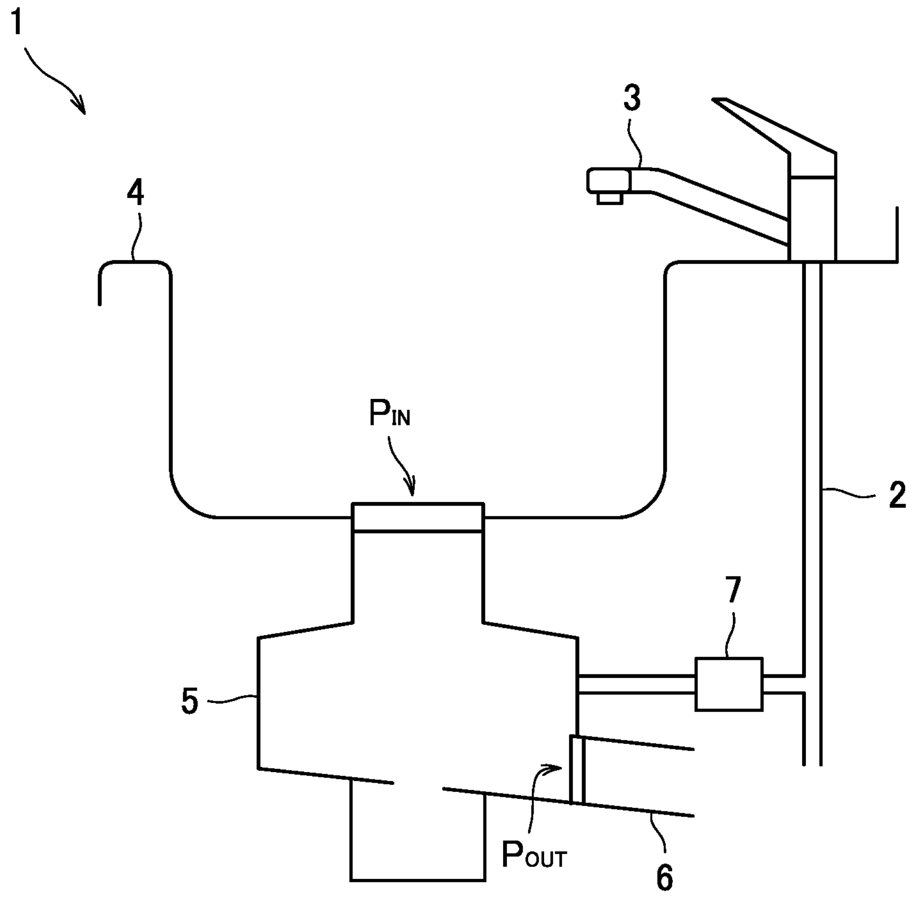
FIG. 1 is an entire configuration diagram showing a drainage system to which the disposer according to the present invention is applied.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

MODE FOR CARRYING OUT THE INVENTION

The embodiments of the present invention are described in detail hereinafter with reference to the drawings. Note that the present invention is not limited to the descriptions below, and may be embodied with arbitrary modifications without changing the gist of the present invention. The drawings used for explanation of the embodiments schematically show constructional members with partial emphasis, enlargement, contraction, omission, or the like for the sake of understanding, and may not accurately represent the scale, shape and the like of the constructional members.

First Embodiment

FIG. 1 is an entire configuration diagram showing a drainage system 1 to which a disposer 5 according to the present invention is applied. The drainage system 1 according to the present invention is a kitchen sink capable of carrying out a pulverization process of kitchen waste and discharging the pulverized kitchen waste together with tap water, and is used in, for example, each dwelling unit of a housing complex such as an apartment house. In the present embodiment, the drainage system 1 is provided with a water pipe 2, a water tap 3, a sink 4, a disposer 5, a drainage pipe 6, and a water supply control unit 7.

More specifically, the drainage system 1 supplies from the water tap 3 through the water pipe 2, tap water used by a user for cooking and dishwashing in the sink 4. In addition, in the drainage system 1, when kitchen waste is thrown into the disposer 5 connected to a lower side of the sink 4, the disposer 5 carries out the pulverization process of the kitchen waste and discharges the kitchen waste together with the tap water through the drainage pipe 6, as described later in detail.

Here, the disposer 5 is connected to the sink 4 at an inlet portion $P_{IN}$ provided in an upper part, and connected to the drainage pipe 6 at an outlet portion $P_{OUT}$ provided in a lower part. Water required for discharge of the kitchen waste is directly supplied to the disposer 5 via the water supply control unit 7 provided on a flow path branching from the water pipe 2, without running through the sink 4.

Figure 2:
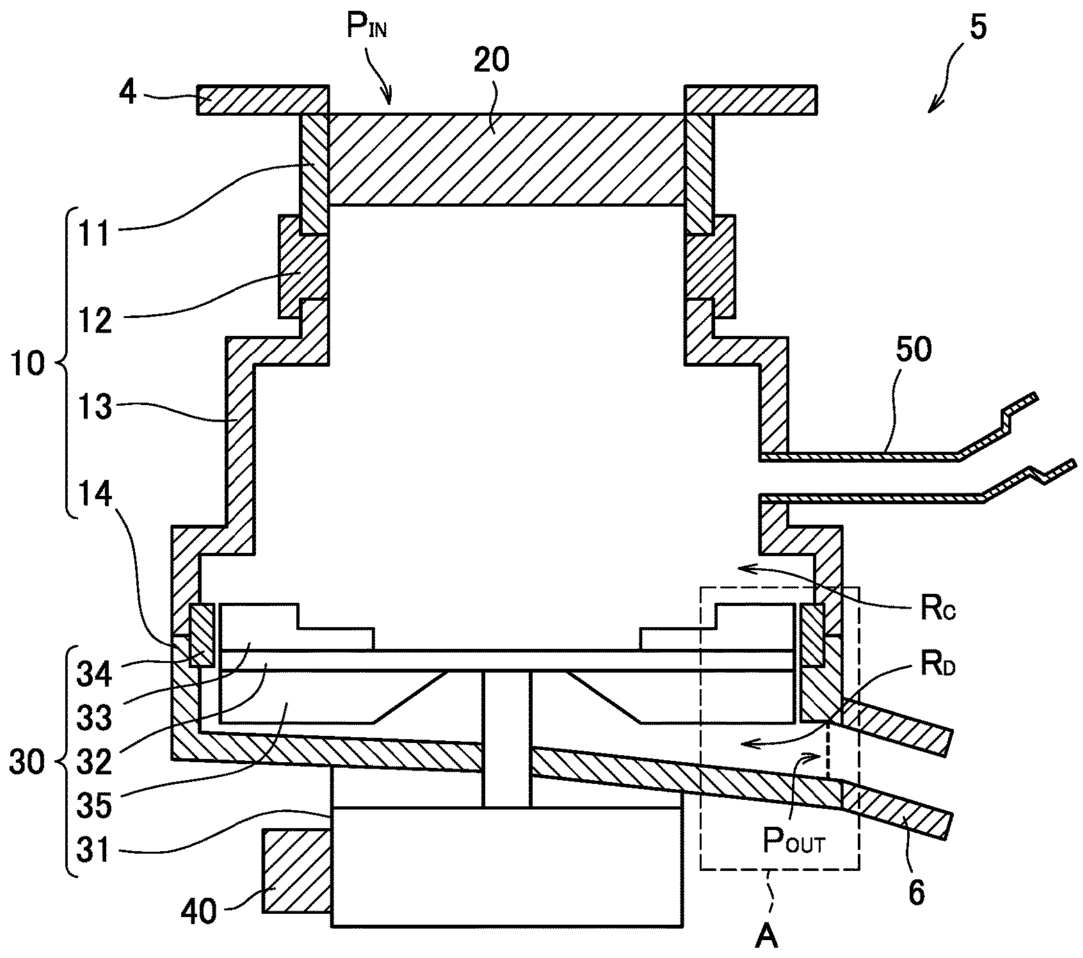
FIG. 2 is a cross-sectional view schematically showing an interior structure of the disposer according to the present invention.

The configuration of the disposer 5 is described further in detail hereinafter. FIG. 2 is a cross-sectional view schematically showing an interior structure of the disposer 5 according to the present invention. The disposer 5 is provided with a housing 10, a lid switch 20, a pulverization mechanism 30, a control unit 40, and a water supply portion 50.

The housing 10 is provided with, in the upper part, the inlet portion $P_{IN}$ through which the kitchen waste is thrown in, and is connected to the drainage outlet of the sink 4 at the inlet portion $P_{IN}$. The housing 10 is also provided with, in the lower part, the outlet portion $P_{OUT}$ through which the kitchen waste is discharged, and is connected to the drainage pipe 6 at the outlet portion $P_{OUT}$. In addition, the housing 10 according to the present embodiment includes, between the inlet portion $P_{IN}$ and the outlet portion $P_{OUT}$, a connecting housing 11, a rubber boot 12, an upper casing 13, and a lower casing 14, thus forming an inner space for carrying out the pulverization process of the kitchen waste.

The connecting housing 11 is formed of a substantially cylindrical metallic member and connected to the drainage outlet of the sink 4 to constitute the inlet portion $P_{IN}$.

The rubber boot 12 is formed of a rubber material having a substantially round horizontal cross section, and interposed between and joins the connecting housing 11 and the upper casing 13. Here, the rubber boot 12 is configured to seal a joint portion between the connecting housing 11 and the upper casing 13 in order to prevent water leakage from the housing, and, due to being formed of an elastic material, not to propagate vibration associated with operation of the disposer 5 to the sink 4.

In the present embodiment, the upper casing 13 is formed of a tubular metallic member having a round horizontal cross section in a stepped manner, to form a space to store kitchen waste prior to pulverization by the pulverization mechanism 30 described later.

In the present embodiment, the lower casing 14 is formed of a bottomed cylindrical metallic member and is connected to the drainage pipe 6 at the outlet portion $P_{OUT}$ formed on a lower lateral face.

The lid switch 20 is configured to be detachable from the housing 10 to enable opening and closing of the inlet portion $P_{IN}$ of the housing 10. The lid switch 20 serves also as a switch for activating the disposer 5. A user throws kitchen waste through the inlet portion $P_{IN}$ and then fits the lid switch 20 into the inlet portion $P_{IN}$ to close and carries out an operation for orienting the lid switch 20 to a predetermined direction in a horizontal plane, to start the pulverization process in the housing 10. The lid switch 20 can thus close the inlet portion $P_{IN}$ such that the kitchen waste inside the housing 10 would not pop out from the inlet portion $P_{IN}$, and, for example, such that the disposer 5 would not be activated in a state in which the user's hand is inserted into the housing 10.

The pulverization mechanism 30 pulverizes the kitchen waste thrown into the housing 10 to such a fineness that the kitchen waste would not clog a flow path on the downstream side of the outlet portion $P_{OUT}$, and includes a motor 31, a rotating plate 32, a hammer 33, a fixed blade 34, and an impeller 35.

The motor 31 is a power source that generates a rotational force for carrying out the pulverization process of kitchen waste, and is arranged below the housing 10 in the present embodiment. And the motor 31 transmits the rotational force to the inside of the housing 10 through a rotary shaft provided such that the rotary shaft penetrates through a bottom face of the housing 10.

The rotating plate 32 is a disk-like member provided parallel to a horizontal plane inside the housing 10, and is formed to have a diameter in a planar view smaller than a diameter of the inner lateral face of the housing 10. In addition, the rotating plate 32 is rotationally driven along with the rotation of the motor 31, due to being connected to the motor 31 via the rotary shaft penetrating through the bottom face of the housing 10. An inner space of the housing 10 is divided by the rotating plate 32 as a boundary being rotationally provided, into a pulverization chamber $R_C$ positioned on an upstream side toward the inlet portion and a discharging chamber $R_D$ on a downstream side toward the outlet portion.

The hammer 33 is provided in a plurality of positions in an edge portion of an upstream side face of the rotating plate 32, and rotates with the rotating plate 32 to thrust in a radial direction the kitchen waste being thrown in.

The fixed blade 34 is a metallic member provided in an annular shape on the inner lateral face of the housing 10, in which a plurality of teeth facing toward the center are provided in an array to surround the rotating plate 32 with an interval. As a result, the kitchen waste thrown into the pulverization chamber $R_C$ is fed through a gap between the hammer 33 and the fixed blade 34 toward the discharging chamber $R_D$ together with tap water, while being pulverized between the hammer 33 and the fixed blade 34.

The impeller 35 is a vane wheel provided on a downstream side face of the rotating plate 32, rotating with the rotating plate 32 to discharge the pulverized kitchen waste and tap water being fed to the discharging chamber $R_D$, through the outlet portion $P_{OUT}$.

The control unit 40 is composed of, for example, a well-known microcomputer control circuit, and controls operation of the disposer 5. More specifically, when the lid switch 20 is fit into the inlet portion $P_{IN}$ to activate the disposer 5, the control unit 40 controls the water supply control unit 7 to supply water from the water supply portion 50 to the housing 10, while performing control by driving the motor 31 to carry out the pulverization process of kitchen waste in the pulverization chamber $R_C$.

The water supply portion 50 is connected to the housing 10 from a lateral face thereof, and constitutes a flow path for introducing into the housing 10 the tap water supplied through the water pipe 2 and the water supply control unit 7.

Figure 3:
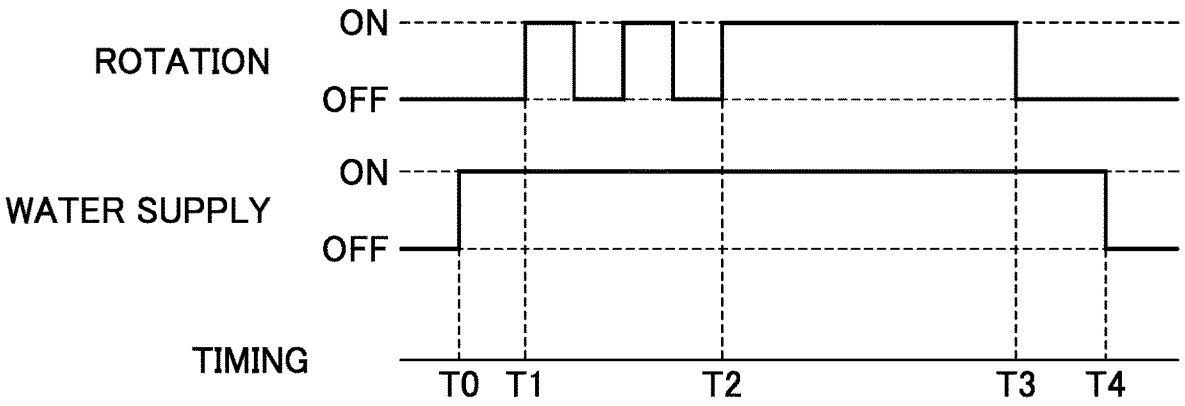
FIG. 3 is a timing chart showing a control procedure of the disposer according to the present invention.

FIG. 3 is a timing chart showing a control procedure of the disposer 5 according to the present invention. More specifically, FIG. 3 is a timing chart showing an example of the timing where the control unit 40 controls the motor 31 and the water supply control unit 7 during an operation period of the disposer 5.

When an activation operation by the lid switch 20 is carried out at timing T0, the control unit 40 controls the water supply control unit 7 to start water supply to the housing 10 via the water supply portion 50. Here, rotation of the motor 31 is not immediately started, to pool inside the housing 10 a predetermined amount of the tap water required for the pulverization process of the kitchen waste, over about five seconds.

Then, at the timing T1 where the predetermined amount of the tap water has been pooled inside the housing 10, the control unit 40 intermittently repeats rotational driving of the motor 31 to perform the control of gradually carrying out the pulverization process of the kitchen waste.

Subsequently, after pulverizing the kitchen waste to a certain degree through the intermittent control of the motor 31, the control unit 40 switches control to continuous driving of the motor 31 at the timing T2, to thereby perform control of pulverizing all of the kitchen waste to such a degree that the kitchen waste can be fed to the discharging chamber $R_D$ over a period before the timing T3 where the rotation of the motor 31 is stopped.

Furthermore, the control unit 40 continues water supply from the water supply portion 50 over a period of about ten seconds between the stopping of rotation of the motor 31 and the timing T4, to wash out a residue of the kitchen waste inside the housing 10. Over the series of control, the control unit 40 carries out the pulverization process of the kitchen waste by the disposer 5 and the washing process of the disposer 5 over about one minute.

Figure 4:
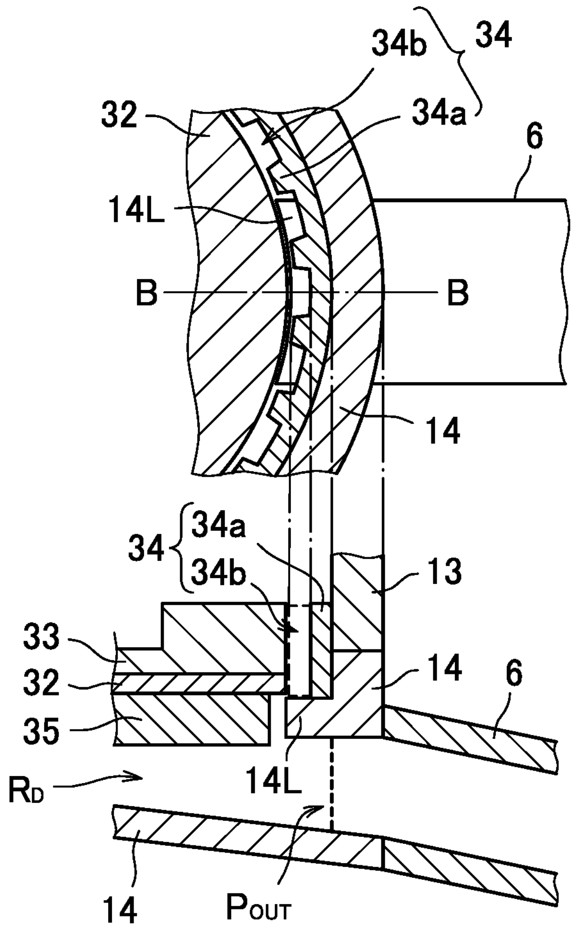
FIG. 4 is a partial cross-sectional view showing a horizontal cross section and a perpendicular cross section of a lower casing of the disposer according to a first embodiment.

A pathway from the pulverization chamber $R_C$ to the discharging chamber $R_D$ through which the kitchen waste passes is described more in detail hereinafter. FIG. 4 is a partial cross-sectional view showing a horizontal cross section and a perpendicular cross section of the lower casing 14 of the disposer 5 according to a first embodiment. More specifically, FIG. 4 is a diagram partially showing a vicinity of the outlet portion $P_{OUT}$ shown in the region A in FIG. 2, with: a horizontal cross-sectional view of a horizontal cross section passing through the rotating plate 32 and the fixed blade 34 viewed from vertically above (upper drawing of FIG. 4); and a vertical cross-sectional view of a perpendicular cross section taken along the B-B line in the upper drawing of FIG. 4, viewed in the horizontal direction (lower drawing of FIG. 4).

As shown in the upper drawing of FIG. 4, the fixed blade 34 is provided in an annular shape along an inner periphery of the lower casing 14, with a plurality of teeth 34*a* facing toward the center being provided in an array at intervals to surround the rotating plate 32, thus forming a gap 34*b* between two adjacent teeth 34*a*. The fixed blade 34 pulverizes the kitchen waste in cooperation with the hammer 33 rotating with the rotating plate 32. The kitchen waste thus pulverized is then fed from the pulverization chamber $R_C$ to the discharging chamber $R_D$ through the gap 34*b*, together with the water supplied from the water supply portion 50.

Note that, as shown in the lower drawing of FIG. 4, the lower casing 14 according to the present embodiment has a visor portion 14L, as the "communication regulation portion" that regulates communication in a vertical direction toward a gap between the rotating plate 32 and the fixed blade 34, being formed above the outlet portion $P_{OUT}$ along the entire circumference of the inner peripheral surface. The pulverized kitchen waste is thus restricted or prevented from passing from the pulverization chamber $R_C$ to the discharging chamber $R_D$ above the outlet portion $P_{OUT}$.

Here, as shown in the lower drawing of FIG. 4, the visor portion 14L according to the present embodiment is formed between the outlet portion $P_{OUT}$ and the fixed blade 34 to extend inward from the inner lateral face of the lower casing 14, to cover at least a part of the gap 34*b*. The visor portion 14L may further extend inward within a range not coming into contact with a rotational mechanism such as the rotating plate 32, the impeller 35, and the like.

Figure 5:
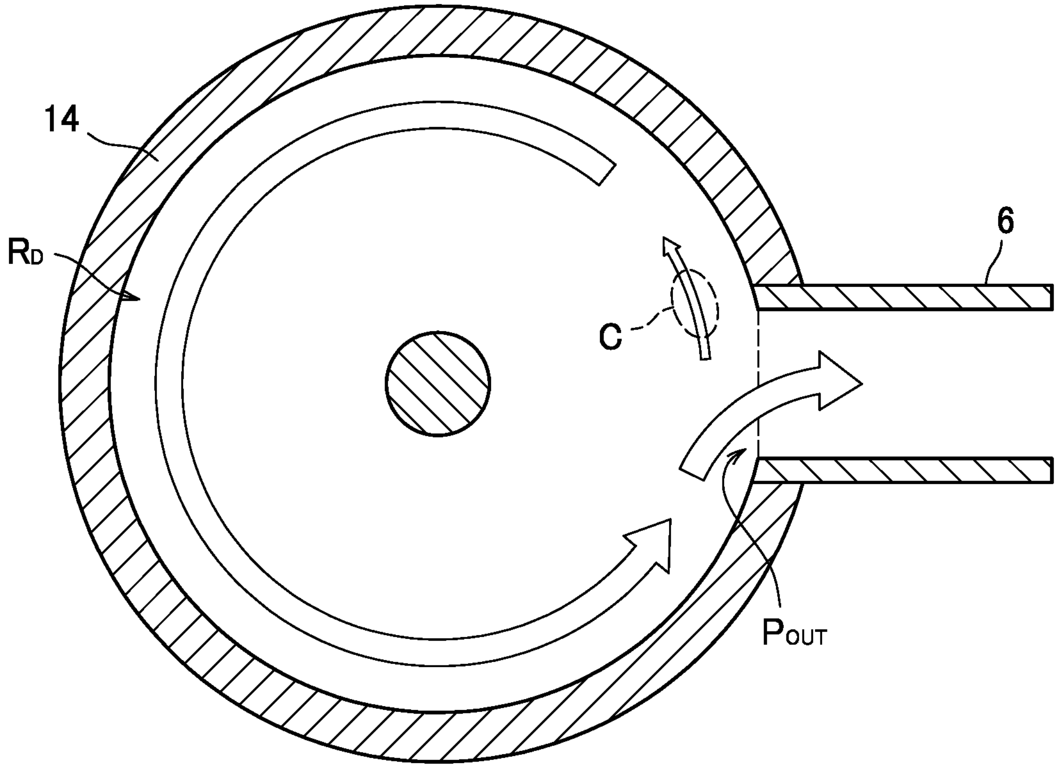
FIG. 5 is a horizontal cross-sectional view schematically showing a water flow in a discharging chamber.

An effect of providing the visor portion 14L is described hereinafter. FIG. 5 is a horizontal cross-sectional view schematically showing a water flow in a discharging chamber $R_D$. More specifically, FIG. 5 shows a horizontal cross section of the lower casing 14 passing through the discharging chamber $R_D$ viewed in the vertical direction, in which water containing pulverized kitchen waste is being discharged from the outlet portion $P_{OUT}$ while generating a water flow around the rotary shaft of the motor 31 in accordance with the rotation of the impeller 35.

The kitchen waste having passed through the gap 34*b* of the fixed blade 34 and fed toward the discharging chamber $R_D$, as described above, falls to the vicinity of the inner lateral face of the lower casing 14, and is then fed to the drainage pipe 6 with the water flow shown in FIG. 5. During this process, most of the water flow is discharged from the outlet portion $P_{OUT}$ in the vicinity of the outlet portion $P_{OUT}$, and the flow rate is thus reduced in the region C shown in FIG. 5. Therefore, if fibrous kitchen waste insufficiently pulverized is fed from above the outlet portion $P_{OUT}$ to the discharging chamber $R_D$, the kitchen waste is likely to be tangled due to stagnancy of water in the vicinity of the outlet portion $P_{OUT}$, causing clogging of the outlet portion $P_{OUT}$ or a downstream part thereof.

Given this, in the lower casing 14 according to the present embodiment, passing of the kitchen waste through the gap 34*b* in the vicinity of the outlet portion $P_{OUT}$ is regulated by providing the visor portion 14L as the "communication regulation portion", to thereby prevent the kitchen waste from being fed to the region C in which stagnancy of water is likely. As a result, even when the insufficiently pulverized fibrous kitchen waste is fed to the discharging chamber $R_D$, tangle is less likely to be generated in the vicinity of the outlet portion $P_{OUT}$, and in turn, suppression of clogging of the outlet portion $P_{OUT}$ or a downstream part thereof is enabled.

As described above, the disposer 5 according to the present invention is configured to: include the pulverization mechanism 30 in which kitchen waste is pulverized through cooperation between the fixed blade 34 and the rotating plate 32 provided with the hammer 33; and feed the kitchen waste thus pulverized with water from the pulverization chamber $R_C$ to the discharging chamber $R_D$ through the gap 34*b* of the fixed blade 34. In addition, the disposer 5 according to the present invention is configured to have the communication regulation portion, which regulates communication in a vertical direction through the gap 34*b*, formed above the outlet portion $P_{OUT}$, not to feed the kitchen waste directly toward the vicinity of the outlet portion $P_{OUT}$ in the discharging chamber $R_D$.

As a result, the disposer 5 according to the present invention is capable of reducing the likelihood of generation of tangle of the kitchen waste, due to not feeding the kitchen waste toward the vicinity of the outlet portion $P_{OUT}$ in the discharging chamber $R_D$ in which stagnancy of water is likely. In addition, the low likelihood of generation of tangle of the kitchen waste in the discharging chamber $R_D$ on the downstream side of the pulverization mechanism 30 eliminates the need for providing a separate mechanism for decomposing the agglomerate of the kitchen waste in the discharging chamber $R_D$. Therefore, the disposer 5 according to the present invention enables suppression of clogging of the outlet portion $P_{OUT}$, while suppressing an increase in the cost.

Furthermore, in the disposer 5 according to the present invention, the communication regulation portion for suppressing clogging of the outlet portion $P_{OUT}$ is formed by extending a part of the lower casing 14. In other words, the disposer 5 according to the present embodiment has the visor portion 14L formed as a shape of a part of the lower casing 14, whereby the communication regulation portion can be formed without providing a separate member, enabling reduction of the cost and improvement of assemblability.

In addition, the disposer 5 according to the present embodiment has the visor portion 14L provided between the outlet portion $P_{OUT}$ and the fixed blade 34, enabling pulverization of kitchen waste with the entire circumference of the annular fixed blade 34, and in turn the pulverization process without a reduction in pulverization efficiency due to the communication regulation portion.

Second Embodiment

Hereinafter, the second embodiment of the present invention is described. The disposer 5' according to the second embodiment is different from the disposer 5 of the first embodiment described above, in a shape of a part of the lower casing 14 and the fixed blade 34. Differences from the first embodiment are described below, while the constitutive elements identical to those of the first embodiment are designated by the same reference signs and detailed description thereof is omitted.

Figure 6:
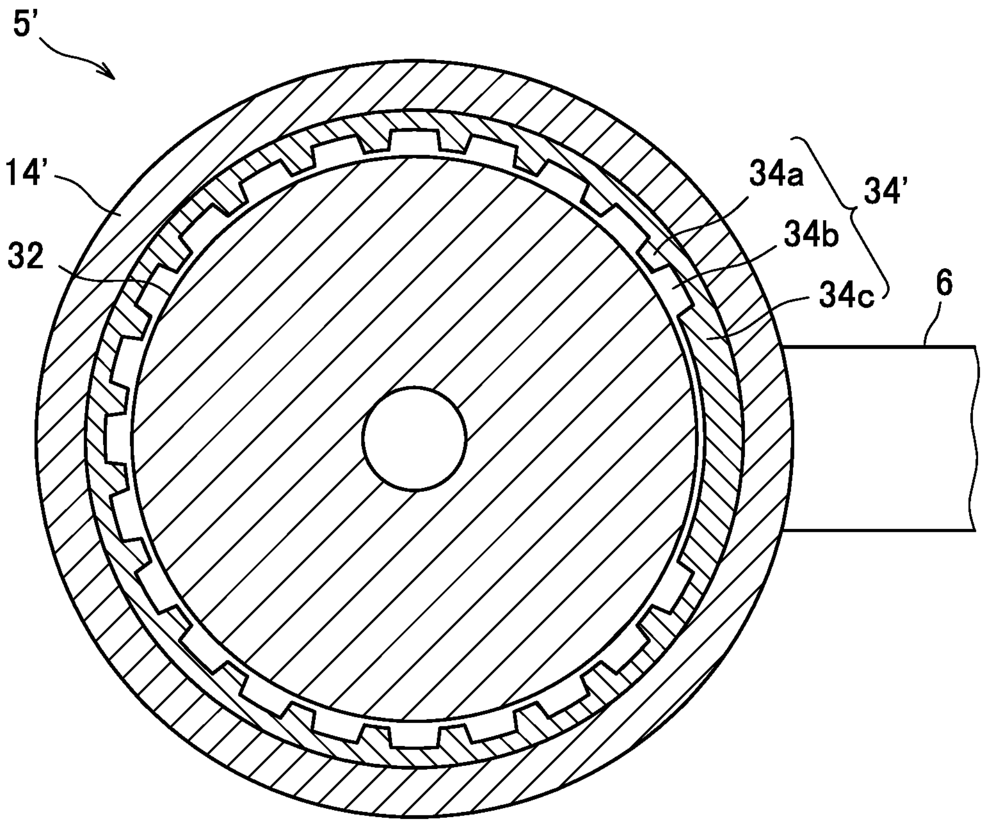
FIG. 6 is a cross-sectional view showing a horizontal cross section of a fixed blade provided in a disposer according to a second embodiment.

FIG. 6 is a cross-sectional view showing a horizontal cross section of the fixed blade 34' provided in the disposer 5' according to the second embodiment. More specifically, FIG. 6 is a cross-sectional view showing a horizontal cross section of the lower casing 14' and the fixed blade 34' of the disposer 5' according to the second embodiment, viewed in the vertical direction.

The fixed blade 34' according to the second embodiment has a blocking portion 34*c* as the "communication regulation Portion" formed above the outlet portion $P_{OUT}$ (not illustrated in FIG. 6), which is a joint portion between the lower casing 14' and the drainage pipe 6. Thus, the lower casing 14' according to the second embodiment is not provided with the visor portion 14L in the first embodiment described above.

In other words, in the disposer 5' according to the second embodiment, the blocking portion 34*c* provided on the fixed blade 34' serves to prevent kitchen waste from being fed directly toward the vicinity of the outlet portion $P_{OUT}$, in place of the visor portion 14L in the first embodiment. Therefore, due to the blocking portion 34*c* formed on the fixed blade 34', the disposer 5' according to the second invention enables suppression of clogging of the outlet portion $P_{OUT}$ while suppressing an increase in the cost, for the same reasons as the first embodiment described above.

The embodiments of the disposer according to the present invention have been described above; however, the present invention is not limited to each of the above-described embodiments. For example, in each of the above-described embodiments, the configuration has been exemplified in which the connecting housing 11, the upper casing 13, and the lower casing 14 are all metallic members; however, these members are not required to be metallic members and may also be resin members.

In addition, in each of the above-described embodiments, the configuration has been exemplified in which the pulverized kitchen waste with water is fed from the pulverization chamber $R_C$ to the discharging chamber $R_D$ through the gap between the rotating plate 32 and the fixed blade 34; however, a plurality of drainage holes passing through the rotating plate 32 in the vertical direction (not illustrated) may be provided in addition. In this case, a part of water supplied from the water supply portion 50 to the pulverization chamber $R_C$ is smoothly fed to the discharging chamber $R_D$ through the drainage holes, enabling an improvement in the flow-down characteristic of the discharging chamber $R_D$.

Furthermore, in each of the above-described embodiments, the configuration has been exemplified in which water required for discharge of kitchen waste is directly supplied into the housing 10 without running through the sink 4; however, a gap may be provided in the lid switch 20 to allow the water flow from the sink 4 to the disposer 5. In this case, water can be drained from the sink 4 even during operation of the disposer 5.

Modes of the Present Invention

The first mode of the present invention is a disposer including: a housing provided with an inlet portion in an upper part thereof through which kitchen waste is thrown in, and an outlet portion on a lower lateral face thereof through which the kitchen waste is discharged together with water; a rotating plate provided in a rotatable manner to separate an inner space of the housing into a pulverization chamber positioned on a side of the inlet portion, and a discharging chamber positioned on a side of the outlet portion; a hammer provided on the rotating plate; and an annular fixed blade that is provided on an inner lateral face of the housing to surround the rotating plate with an interval, and pulverizes the kitchen waste in cooperation with the hammer, in which a communication regulation portion that regulates communication in a vertical direction toward a gap between the rotating plate and the fixed blade is formed above the outlet portion.

The disposer according to the first mode of the present invention is configured to: include a pulverization mechanism in which kitchen waste is pulverized through cooperation between the fixed blade and the rotating plate provided with the hammer; and feed the kitchen waste thus pulverized with water from the pulverization chamber to the discharging chamber through the gap of the fixed blade and the rotating plate. In addition, the disposer is configured to have the communication regulation portion, which regulates communication in a vertical direction through the gap, formed above the outlet portion not to feed the kitchen waste directly toward the vicinity of the outlet portion in the discharging chamber.

As a result, the disposer is capable of reducing the likelihood of generation of tangle of the kitchen waste, due to not feeding the kitchen waste toward the vicinity of the outlet portion in the discharging chamber in which stagnancy of water is likely. In addition, in the disposer, the low likelihood of generation of tangle of the kitchen waste in the discharging chamber on the downstream side of the pulverization mechanism eliminates the need for providing a separate mechanism for decomposing the agglomerate of the kitchen waste in the discharging chamber. Therefore, the disposer according to the first mode of the present invention enables suppression of clogging of the outlet portion, while suppressing an increase in the cost.

The second mode of the present invention is the disposer of the first mode of the present invention described above, in which the communication regulation portion is composed of a part of the housing extending above the outlet portion.

The disposer according to the second mode of the present invention has the communication regulation portion formed as a shape of a part of the housing, whereby the communication regulation portion can be formed without providing a separate member, enabling reduction of the cost and improvement of assemblability.

The third mode of the present invention is the disposer of the second mode of the present invention described above, in which the communication regulation portion is provided between the outlet portion and the fixed blade.

The disposer according to the third mode of present embodiment enables pulverization of kitchen waste with the entire circumference of the annular fixed blade, and in turn the pulverization process without a reduction in pulverization efficiency due to the communication regulation portion.

EXPLANATION OF REFERENCE SIGNS

1 Drainage system
2 Water pipe
3 Water tap
4 Sink
5, 5' Disposer
6 Drainage pipe
7 Water supply control unit
10 Housing
11 Connecting housing
12 Rubber boot
13 Upper casing
14, 14' Lower casing
14L Visor portion
20 Lid switch
30 Pulverization mechanism
31 Motor
32 Rotating plate
33 Hammer
34, 34' Fixed blade
34*a* Teeth
34*b* Gap
34*c* Blocking portion
35 Impeller
40 Control unit
50 Water supply portion
$P_{IN}$ Inlet portion
$P_{OUT}$ Outlet portion
$R_C$ Pulverization chamber
$R_D$ Discharging chamber

The invention claimed is:

1. A disposer comprising:

a housing provided with an inlet portion in an upper part thereof through which kitchen waste is thrown in, and an outlet portion on a lower lateral face thereof through which the kitchen waste is discharged together with water;

a rotating plate provided in a rotatable manner to separate an inner space of the housing into a pulverization chamber positioned on a side of the inlet portion, and a discharging chamber positioned on a side of the outlet portion;

a hammer provided on the rotating plate; and an annular fixed blade that is provided on an inner lateral face of the housing to surround the rotating plate with an interval, and pulverizes the kitchen waste in cooperation with the hammer, wherein a communication regulation portion is composed of a part of the housing extending horizontally above the outlet portion, and covers at least a part of a gap between the rotating plate and the fixed blade above the outlet portion to regulate communication of the kitchen waste in a vertical direction toward the gap.

2. The disposer according to claim 1, wherein the communication regulation portion is provided between the outlet portion and the fixed blade.

* * * * *